No. 857,167. PATENTED JUNE 18, 1907.
S. FINE.
COOKING UTENSIL.
APPLICATION FILED JULY 3, 1906.
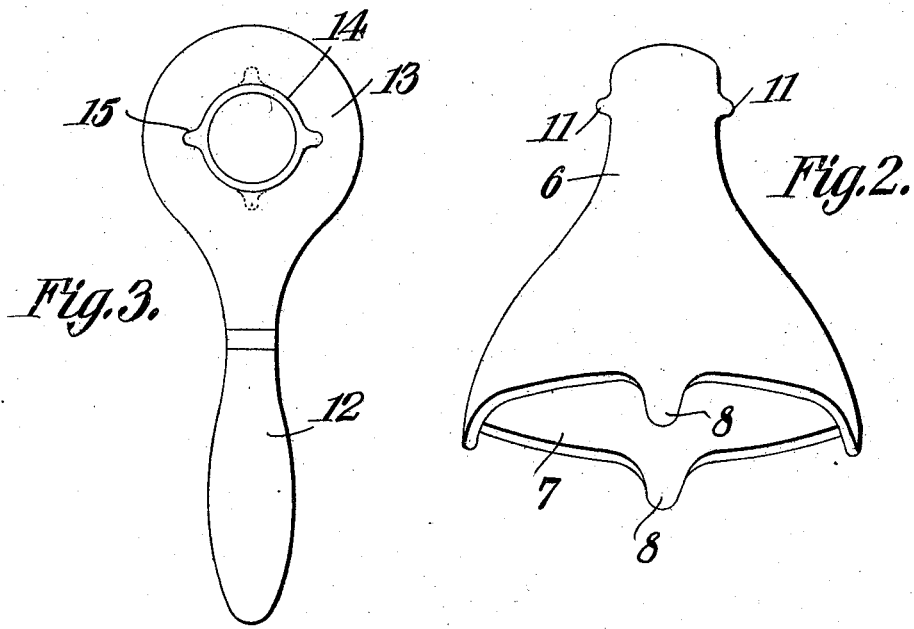
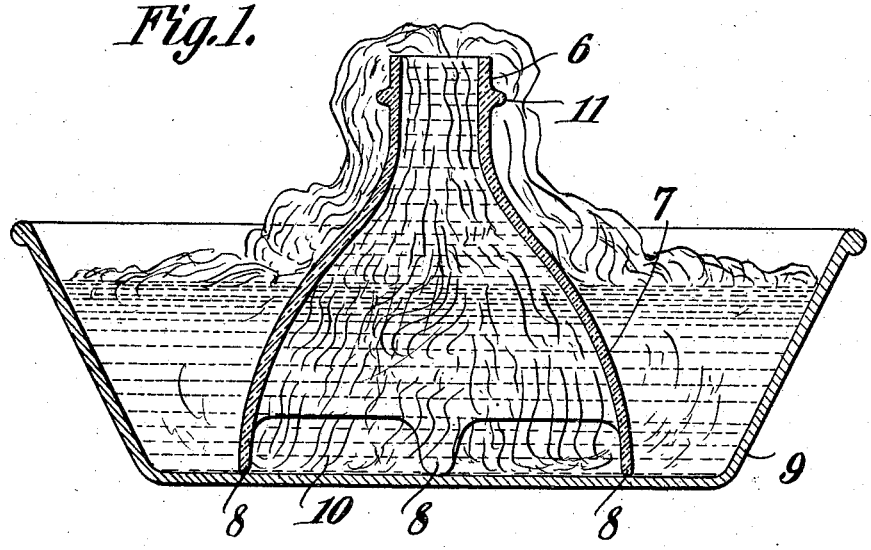
Samuel Fine
INVENTOR.

UNITED STATES PATENT OFFICE.

SAMUEL FINE, OF ARCADIA, PENNSYLVANIA.

COOKING UTENSIL.

No. 857,167.      Specification of Letters Patent.      Patented June 18, 1907.

Application filed July 3, 1906. Serial No. 324,640.

*To all whom it may concern:*

Be it known that I, SAMUEL FINE, a subject of the Czar of Russia, residing at Arcadia, in the county of Indiana, and State of Pennsylvania, have invented a new and useful Cooking Utensil, of which the following is a specification.

This invention relates to cooking utensils and more particularly to means for preventing milk, and other liquids from flowing over the sides of a containing vessel when boiling or otherwise cooking the same.

The object of the invention is to provide a comparatively simple and inexpensive device of this character comprising a hollow body portion provided with spaced depending lugs or feet which bear against the bottom of the vessel and permit the liquid to flow through the contracted neck thereof and back into the vessel thereby promoting circulation of the liquid and effectually preventing the same from flowing over the sides of the vessel.

A further object is to form the side walls of the body portion with laterally extending lugs for engagement with an operating handle whereby the device may be conveniently removed from the containing vessel after the cooking operation.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a longitudinal sectional view of the improved device showing the same in position in a liquid containing vessel. Fig. 2 is a perspective view of the device detached. Fig. 3 is a top plan view showing the operating handle in engagement with the lugs on the body portion.

Similar numerals of reference indicate corresponding parts in all of the figures of the drawings.

The improved device consists of a hollow body portion substantially conical in shape as shown and formed of glass or other suitable material, said body portion being provided with a reduced neck 6 and having its enlarged lower end 7 formed with depending lugs or feet 8 adapted to rest on the bottom of a suitable liquid containing vessel, indicated at 9.

The lugs or feet 8 are spaced apart to form a plurality of passages 10 to permit the liquid within the vessel 9 to flow through the body portion and contracted neck 6 and thence downwardly over the inclined exterior walls of the body portion into the vessel thus promoting circulation of the liquid and effectually preventing the same from flowing over the sides of the containing vessel.

Extending laterally from the exterior walls of the body portion at the contracted end thereof are one or more lugs 11 which co-operate with a handle or lifting member 12 so that the device may be conveniently removed from the containing vessel after the milk, or other liquid has been cooked. The handle 12 is provided with a flat plate or extension 13 having a circular opening 14 formed therein for the reception of the neck 6 of the body portion, there being a pair of openings 15 formed in the plate 13 and communicating with the opening 14 as shown so that by placing the handle on the neck 6 and rotating the plate 13 until the openings 15 register with the lugs 11 and then partially rotating said plate the lugs 11 will bear against the imperforate portion of the plate and thus permit the body portion to be conveniently lifted from the vessel 9 without danger of burning or otherwise injuring the handle.

In operation the body portion is positioned within the pan or other containing vessel 9 with the feet 8 resting on the bottom thereof as best shown in Fig. 1 of the drawing. As the liquid within the vessel 9 becomes heated the same will flow upwardly through the contracted portion of the neck and thence downwardly over the converging walls back into the pan. After the cooking operation has been effected the handle is positioned on the neck of the body portion and partially rotated thus permitting the device to be conveniently removed from the liquid containing vessel, as before stated.

The device may be made in different sizes and shapes and formed of glass, metal or other suitable material.

From the foregoing description it is thought that the construction and operation of the device will be readily understood by those skilled in the art and further description thereof is deemed unnecessary.

Having thus described the invention what is claimed is:

The combination with a hollow body portion having its upper end provided with a reduced neck the exterior walls of which are smooth and unobstructed and having its lower portion provided with integral depending supporting feet extending in the same plane with the side walls of the body portion and having their free ends rounded and spaced apart to form a plurality of liquid passages, a pair of integral lugs extending laterally from the smooth exterior walls of the neck and spaced from the upper end of said neck, and a lifting device including a handle provided with a flat plate having a centrally disposed opening formed therein for the reception of the neck of the body portion and provided with oppositely disposed recesses communicating with the central opening and adapted to receive the lugs on said neck whereby when the plate is rotated on the neck the lugs will engage the imperforate portion of said plate.

In testimony that I claim the foregoing as my own, I have hereto affixed my signature in the presence of two witnesses.

SAMUEL FINE.

Witnesses:
   Max. Brody,
   Harry Brass.